(12) United States Patent
Geiman

(10) Patent No.: US 7,827,692 B2
(45) Date of Patent: Nov. 9, 2010

(54) VARIABLE CASE DEPTH POWDER METAL GEAR AND METHOD THEREOF

(75) Inventor: Timothy E. Geiman, South Lyon, MI (US)

(73) Assignee: GKN Sinter Metals, Inc., Auburn Hills, MI (US)

( * ) Notice: Subject to any disclaimer, the term of this patent is extended or adjusted under 35 U.S.C. 154(b) by 1264 days.

(21) Appl. No.: 11/277,388

(22) Filed: Mar. 24, 2006

(65) Prior Publication Data

US 2007/0221006 A1 Sep. 27, 2007

(51) Int. Cl.
*B21K 1/30* (2006.01)
*F16H 55/17* (2006.01)

(52) U.S. Cl. .............. 29/893.3; 29/893; 29/893.34; 74/459.5

(58) Field of Classification Search .......... 29/893, 29/893.1, 893.3, 893.34, 893.36, 893.37; 74/459.5, 434, 446, 457, 460; 419/28
See application file for complete search history.

(56) References Cited

U.S. PATENT DOCUMENTS

| | | | | |
|---|---|---|---|---|
| 3,100,333 | A * | 8/1963 | Friend | 29/893.1 |
| 3,992,763 | A | 11/1976 | Haynie et al. | |
| 4,002,471 | A | 1/1977 | Sarnes et al. | |
| 4,165,243 | A | 8/1979 | Sarnes et al. | |
| 6,352,008 | B1 * | 3/2002 | Matsuoka et al. | 74/433.5 |
| 2004/0093729 | A1 * | 5/2004 | Roeske et al. | 29/893.3 |
| 2007/0221005 | A1 * | 9/2007 | Geiman | 74/459.5 |
| 2007/0224075 | A1 * | 9/2007 | Geiman | 419/28 |

FOREIGN PATENT DOCUMENTS

| | | |
|---|---|---|
| DE | 10 2006 024441 A1 | 11/2006 |
| EP | 0 371 340 A | 6/1990 |
| GB | 2 035 167 A | 6/1980 |
| WO | 02/00378 A | 6/2001 |

OTHER PUBLICATIONS

PCT/US2007/076170 International Search Report.
Seki M. et al., Surface Fatigue Failure and Strength of Case-Hardened Powder-Forged Rollers and Gears, VDI Berichte Duesseldorf, DE, No. 1904, 2005, pp. 1773-1779.

* cited by examiner

*Primary Examiner*—David P Bryant
*Assistant Examiner*—Ryan J Walters
(74) *Attorney, Agent, or Firm*—Quarles & Brady LLP

(57) ABSTRACT

A gear and a method of making a forged powder metal gear having a plurality of teeth and a variable case depth profile forged in the plurality of teeth. Each tooth of the plurality of teeth has a first surface and a tooth root. A variable case depth profile is formed in each tooth of the plurality of teeth, whereby the variable case depth profile exhibits greater tooth wear resistance on the first surface and greater impact resistance in the tooth root.

8 Claims, 4 Drawing Sheets

VARIABLE CASE DEPTH POWDER METAL GEAR AND METHOD THEREOF

CROSS-REFERENCE TO RELATED APPLICATIONS

The present invention is related to application Ser. No. 11/277,392 entitled "Forged Carburized Powder Metal Part and Method" filed simultaneously herewith and incorporated by reference herein.

TECHNICAL FIELD

The invention relates to a forged powder metal part and more particularly to a variable case depth powder metal part, including a method of manufacture thereof.

BACKGROUND OF THE INVENTION

There is continuing demand for manufacturing processes that may lessen the cost, time or steps in producing a part. More often than not, the benefits resultantly associated with improving the manufacturing process are necessitated in the first instance by customer requirements to develop and improve products to have superior dimensional, mechanical and/or performance properties. For instance a typical differential side gear may have any or all of the following performance requirements such as: the spline area requiring dimensional precision, high shear strength and brinnelling resistance; the hub and thrust faces requiring dimensional precision, surface finish and case compatibility; the gear geometry requiring dimensional precision, surface finish and optimised profile; and the tooth and core strength may require impact resistance, wear resistance, spalling resistance, and different surface and core metallurgies. Different non-compatible manufacturing processes, i.e. casting, steel forging or powder metal forging, obtain different performance requirements for the same part, advantageously or otherwise.

Referring to FIG. 1, in order to meet some of these performance requirements, a gear 10 is made by forging a powder metal 14 and then case carburizing the gear to achieve a nearly constant effective case depth 16. The constant effective case depth 16 for each gear tooth 12 is shown in the partial cross-sectional view of FIG. 1. The parameters to be controlled to achieve nearly constant carburization of a fully dense part of specific hardness, case depth and carbon gradient are generally known. However, a nearly constant case depth does not necessarily achieve desired mechanical properties such as enhanced tooth wear and fatigue strength. It would be advantageous to achieve a better-controlled balance of these performance requirements in the final product, uncompromised by the manufacturing process thereby saving time, processing or cost.

A manufacturing process to improve the performance requirements of powder metal parts in a process known today as "sint-carb" is disclosed in U.S. Pat. No. 3,992,763 titled "Method of Making Powdered Metal Parts." The process teaches carburization during or subsequent to sintering, and prior to forging, to enhance the case depth at a critical wall of the final forged product, eliminating the need for subsequent heat treating processes for achieving a case hardness. U.S. Pat. No. 4,002,471 titled "Method of Making a Through-Hardened Scale-Free Forged Powdered Metal Article Without Heat Treatment After Forging", discloses a method of making forged powder iron base metal articles of high Rc hardness without need for further machining, surface treatment or heat treatment after quenching.

However, the above-mentioned patents do not teach or suggest any processes in which a variable case depth may be obtained in a final forged product to enhance performance features such as improved load bearing upon the tooth flank of a gear while providing impact resistance and bending fatigue resistance upon the tooth root.

Therefore, there is a need for a variable case depth powder metal gear exhibiting improved tooth wear resistance and load bearing at its flank surface, and improved impact resistance and bending fatigue in the tooth root. There is also a need for a method of manufacture of a variable case depth powder metal gear.

SUMMARY OF THE INVENTION

In accordance with the above mentioned needs, a gear and a method of making a forged powder metal gear having a plurality of teeth and a variable case depth profile forged in the plurality of teeth is disclosed. Each tooth of the plurality of teeth has a first surface and a tooth root. A variable case depth profile is formed in each tooth of the plurality of teeth, whereby the variable case depth profile exhibits improved tooth wear resistance or load bearing on the first surface, and improved impact resistance and bending fatigue in the tooth root or core.

BRIEF DESCRIPTION OF THE DRAWINGS

For a more complete understanding of this invention, reference should now be made to the inventive aspects illustrated in greater detail in the accompanying drawings and described below.

DETAILED DESCRIPTION

Figure 1:
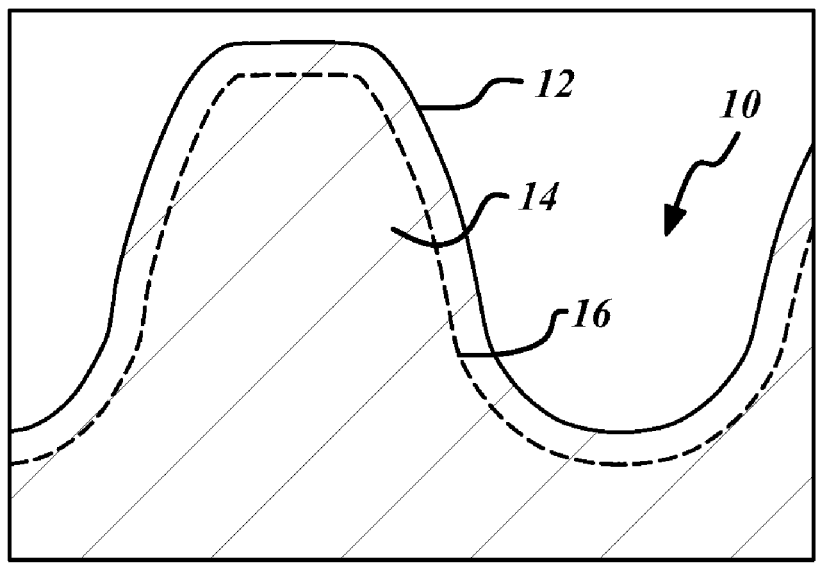
FIG. 1 shows a partial cross-sectional view of a case carburized gear.

In all figures, the same reference numerals are used to identify like parts in the various views. Thus, simultaneous reference to the various figures is appropriate. In some instances, for clarity, equivalent parts in different figures may have different item numbers.

Figure 2:
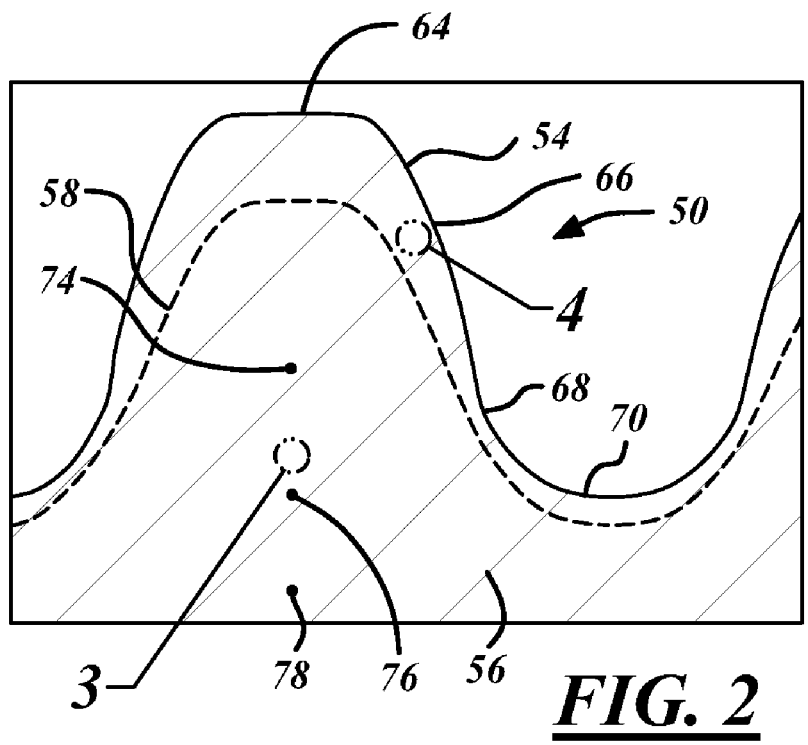
FIG. 2 shows a partial cross-sectional view of a first differential side gear inventively having a variable case depth profile in accordance with an embodiment of the invention.
Figure 6:
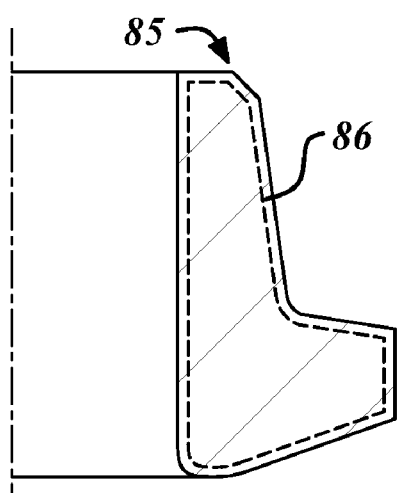
FIG. 6 shows a partial cross-sectional view of the representative preform of FIG. 5 after carburization process.
Figure 7:
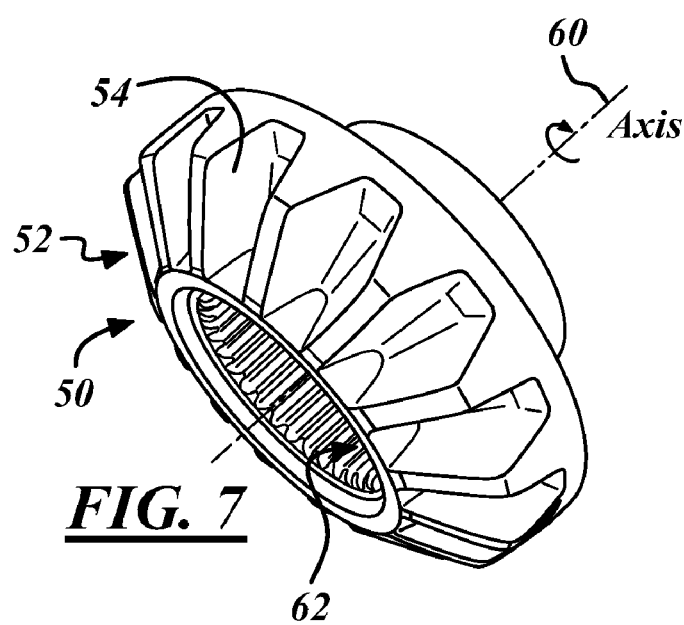
FIG. 7 shows an isometric view of the first differential side gear of FIG. 2 made from the preform of FIG. 6 in accordance with an embodiment of the invention.

FIG. 2 shows a partial cross-sectional view of a first differential side gear 50 having a variable case depth profile 58 in accordance with an embodiment of the invention. FIG. 7 shows an isometric view of the first differential side gear 50 of FIG. 2 made from the preform 85 of FIG. 6 in accordance with an embodiment of the invention.

The first differential side gear 50 includes plurality of teeth 52 and a variable case depth profile 58. Each tooth of the plurality of teeth 52 has a first surface 54 and a tooth core or root 56. The first differential side gear 50 has a rotational axis 60, wherein the teeth 52 extend radially in the same general direction as the rotational axis of the gear, but are inclined with respect to the rotational axis. The first differential side gear 50 further includes an axially splined internal section 62 axially aligned with the rotational axis 60.

The variable case depth profile 58 is formed in the plurality of teeth 52. The variable case depth profile 58 advantageously provides a gear having greater tooth wear resistance on the first surface 54 and greater impact resistance in the tooth root 56. The variable case depth profile 58 is representative of the effective case depth profile achieved after forging, by carbon diffusion prior to forging the gear. The variable case depth profile 58 resultantly achieved by the forging process is discussed herein.

While the process is described with respect to a differential side gear 50, it is anticipated that the variable case depth profile 58 may be achieved on other parts or gears, including bevel, differential or pinion gears, without limitation.

The differential side gear 50 may be made from a low alloy, fully compacted, ferrous powder metal material. However, it is anticipated that the gear may be made of various other types of forged powder metal steels.

Turning to FIG. 2, the first surface 54 of each tooth of the differential side gear 50 includes a tip surface 64, a pitch line surface 66, a root fillet surface 68 and a root diameter or land surface 70. The variable case depth profile 58 is substantially represented by effective case depth of: 2.4 mm at the tip surface 64; 1.9 mm at the pitch line surface 66; 0.4 mm at the root fillet surface 68; and 0.8 mm at the root land surface 70. This results from the carbon diffusion and subsequent forging of a preform. While specific numbers are presented in the present embodiment, it is recognized that the variable case depth may have any non-constant effective case depth profile over a particular surface cross-section and is not limited to the specific profile here presented.

The variable case depth profile 58 may also be represented by a case depth ratio. The effective case depth ratio is given by comparing case depths measured at the tip surface 64 to the root fillet surface 68, the pitch line surface 66 to the root fillet surface 68, or the root land surface 70 to the root fillet surface 68. For example, the variable case depth ratio for the tip surface 64 to the root fillet surface 68 is 6:1, the pitch line surface 66 to the root fillet surface 68 is 19:4, and the root land surface 70 to the root fillet surface 68 is 2:1. A case depth ratio of nearly 1:1 is considered to be within the effective range of a constant case depth 16 of the gear 10 shown in FIG. 1.

Advantageously, the case depth ratio may be 6:1 over the variable case depth profile 58 from the greatest depth to the shallower depth of effective case hardness, thereby achieving greater mechanical properties such as tooth wear and impact resistance.

The tooth root 56 of the gear 50 may include a mid-tooth section 74 having hardness of about 43 HRC, a root section 76 having hardness of about 31 HRC and a core section 78 having hardness of about 32 HRC. While these hardness numbers are only representative of a gear having improved mechanical properties, a core hardness ratio is obtained between the mid-tooth section 74 and the root or core sections 76, 78 of nearly 4 to 3. A higher core hardness ratio is representative of a gear having greater tooth impact resistance, i.e. ductility. Whereas a gear, like the one represented in FIG. 1, would have nearly a 1 to 1 core hardness ratio and thus, less ductility.

Figure 3:
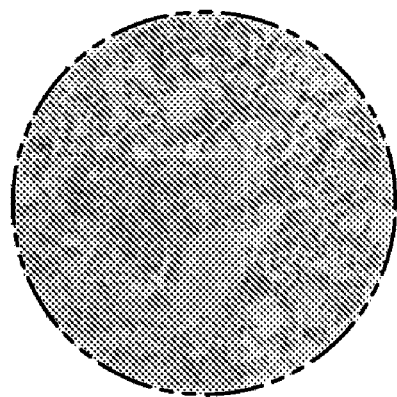
FIG. 3 shows the microstructure below the effective case depth of the inventive gear shown in FIG. 2.
Figure 4:
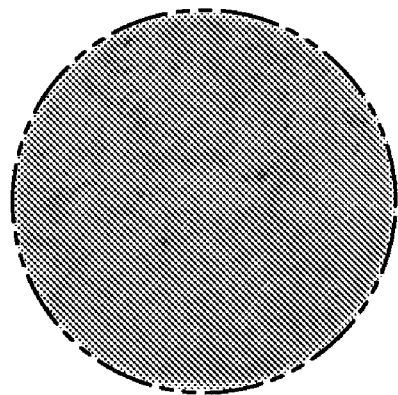
FIG. 4 shows the microstructure within the effective case depth of the inventive gear shown in FIG. 2.

FIG. 3 shows the microstructure below the effective case depth of the inventive gear shown in FIG. 2, and FIG. 4 shows the microstructure within the effective case depth of the inventive gear shown in FIG. 2. The depth boundary is the point where the effective carbon content of the material becomes nearly constant and may be effectively represented by the variable case depth profile 58.

Figure 8:
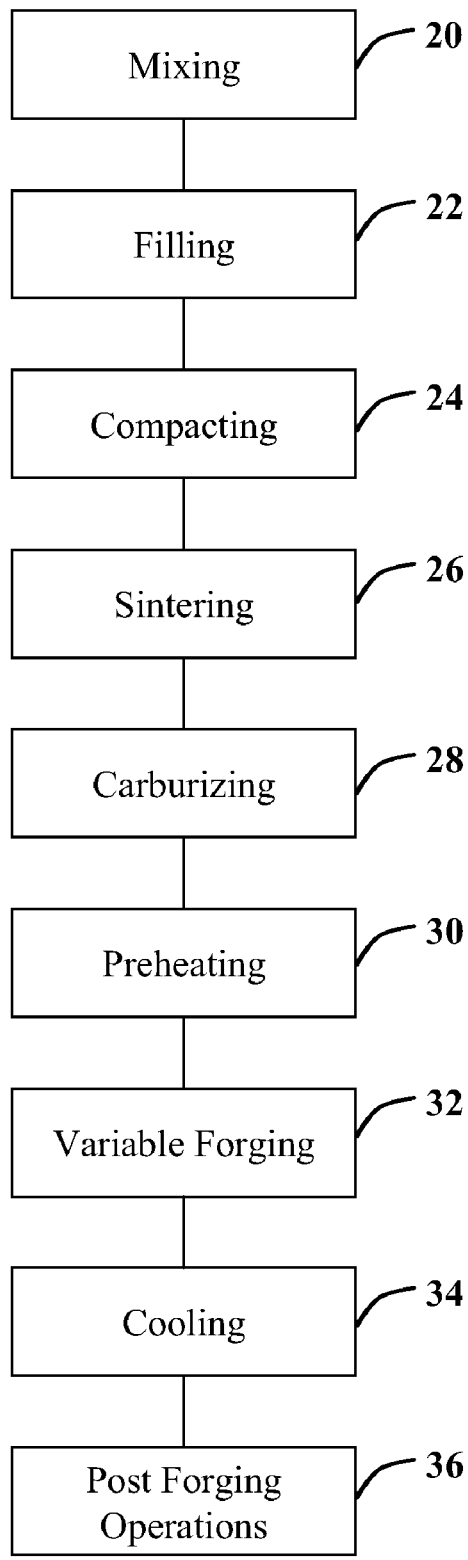
FIG. 8 shows a schematic layout of an embodiment of a process according to the invention to obtain a variable case depth powder metal gear.

Turning to the method of making the inventive variable case depth powder metal gear, a process is shown in FIG. 8. The process begins with the steps of mixing 20 and continues with some of the possible steps of filling 22, compacting 24, sintering 26, carburizing 28, preheating 30, variable forging 32, and cooling 34. Post forging operations 36 may also be used to further enhance the gear. For brevity, and because some of these process steps are well known to those in the art of forging powder metals, only certain aspects of the inventive process are discussed below. In this regard, material selection, temperature processing and compaction pressures are discussed only briefly.

The mixing step 20 readies the metal powder, including any needed binders or lubricants, by mixing until a nearly uniform mixture is achieved ready for filling into a compacting form during the filing step 22. The compacting step 24 comprises compacting a metal powder into a preform having a nearly uniform initial carbon content throughout the preform. The initial carbon content is achieved by mixing of the metal powder with constituent amounts of graphite together with necessary binders or lubricants to make the preform. The preform includes at least one cross-sectional surface in which the final forged part resultantly obtains a variable case depth profile, as discussed herein.

Figure 5:
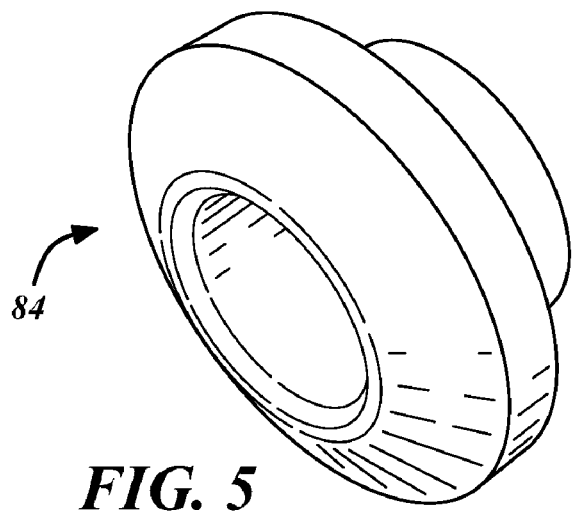
FIG. 5 shows an isometric view of a preform after sintering representative of aspects of the invention required to obtain the inventive product after forging.

The sintering and carburizing steps 26, 28 may be accomplished simultaneously or the carburizing step may be completed after sintering of the preform. Sintering the preform binds the metal powder. Carburizing the preform substantially increases the initial carbon content in developing a carbon gradient from the surface of the preform into the core. The carbon gradient is produced by providing a controlled carbon atmosphere and maintaining the preform in the controlled atmosphere for a predetermined period of time. It is necessary to obtain a substantially constant carbon case depth in the preform in order to enhance critical flow of metal during forging for achieving the desired variable case depth profile in the post forged part. Of course, density gradient, part geometry and carburizing conditions dictate the uniformity of the carburizing process. The case depth of carbon necessary in the preform is determined by the preform geometry and the desired areas of critical metal flow during forging. To achieve the variable case depth profile in gear 50 mentioned above as measured by the ratios presented, the preform is carburized to a case depth of ¼ the tooth height, but may also be satisfied by carburizing to a case depth of ½₀ the tooth height or to ⅞ the tooth height. It is anticipated that too little case depth in the preform may result in non-carburized areas. It is also anticipated that too much case depth in the preform may result in a nearly constant case depth profile. FIG. 6 shows a partial cross-sectional view of the carburized preform 85 of the representative preform 84 of FIG. 5 after carburization process. The preform 85 has substantially constant carbon case depth 86 achieved after sintering and carburizing the preform.

The variable forging step 32 comprises forging the carburized preform at a forge temperature and a forge pressure to obtain a substantially dense, net shape, part. The variable case depth profile for the gear results in nearly symmetrical profiles for each tooth because of the symmetrical nature of the forging dies and the carburized preform. However, it is recognized that different carburization schemes and forging steps may be used to obtain multiple variable case depth profiles.

The variable case depth profile is achieved by utilizing a die set of the forge to variably enhance critical flow of the carburized metal portion during the forging process. Essentially, the constant case depth of the carburized powder metal preform is strategically compressed into the die sections, wherein portions of the preform are stretched and thinned during forging and other portions of the preform are thickened and deepened with the carburized powder metal. Again, case depth that is too shallow or too deep in the carburized powder metal preform prior to forging will not produce the variable case depth profile in the final product.

The cooling step 34 allows the forged part to obtain a particular metallurgy resulting in a gear having the desired variable case depth profile. Cooling of the forged part may be by quenching in oil, water, air or by other methods suitable to the powder metal forging process.

Prior to cooling, including a dwelling step of the forged part for a dwell period may allow for enhanced properties by allowing temperature stabilization of the material of the part.

The optional preheating step of the preform to a pre-forge temperature prior to forging may enhance the desired metal flow during the forging process.

Optional post forging operations step 36 may include, turning, facing, surface grinding, splining, and broaching of the product depending upon final specification requirements, thereby being ready for washing, packing, or shipping.

With proper selection and combinations of powder metal, compaction dies, processing times, processing temperatures, processing pressures, forging dies, and cooling method a near net shape, fully dense product may be obtained having the variable case depth profile, thereby requiring minimal if any machining operations facilitating cost savings and performance improvements.

While various process steps have been presented, they are intended only to be limited in scope or order as indicated in the claims of this invention. Further, while the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A method for obtaining a bevel gear made from powder metal having a variable case depth profile formed in a plurality of teeth comprising the sequential steps of:
   compacting a metal powder into a preform having a nearly uniform initial carbon content throughout said preform, said preform having at least one cross-sectional surface desired to have a variable case depth profile;
   sintering and carburizing, sequentially or simultaneously, said preform at a desired temperature, said carburizing substantially increasing an initial carbon content to provide a controlled carbon atmosphere, and maintaining said preform in said controlled atmosphere for a predetermined period of time to obtain an initial carbon case having a substantially constant carbon case depth;
   forging said preform in a forge at a forge temperature and a forge pressure to obtain a substantially dense and near net shape forged part with said variable case depth profile symmetrical about said plurality of teeth, wherein said variable case depth profile is achieved by utilizing a die set of the forge to variably enhance critical flow of metal, said die set being shaped to cause some portions of said initial carbon case in said plurality of teeth to be stretched and thinned and other portions of said initial carbon case in said plurality of teeth to be thickened and deepened during forging of said plurality of teeth; and
   cooling said forged part;
   wherein said plurality of teeth of said bevel gear extend radially in the same general direction as a rotational axis of said bevel gear, but are inclined with respect to said rotational axis, such that during forging the die set forges said plurality of teeth at an angle relative to said rotational axis.

2. The method of claim 1 further comprising preheating said preform to a pre-forge temperature prior to forging, and cooling said forged part by quenching.

3. The method of claim 1 further comprising dwelling said forged part for a dwell period to allow for temperature stabilization after forging and prior to quenching.

4. The method of claim 1 further comprising splining said gear after cooling.

5. The method of claim 1 comprising, after cooling, performing at least one of scaling, surfacing, turning, and shot peening on said forged part.

6. The method of claim 1 wherein said metal powder is a low alloy ferrous metal powder.

7. The method of claim 1 wherein said gear is near net shape after forging and cooling.

8. The method of claim 1, wherein said variable case depth profile for at least one tooth in the plurality of teeth has a case depth at a tip of the tooth that is greater than a case depth at a corresponding root of the tooth and further has a case depth at a root fillet surface, between the tip and the corresponding root of the tooth, that is less than both the case depth of the tip and the case depth of the corresponding root.

\* \* \* \* \*